Figure 2:
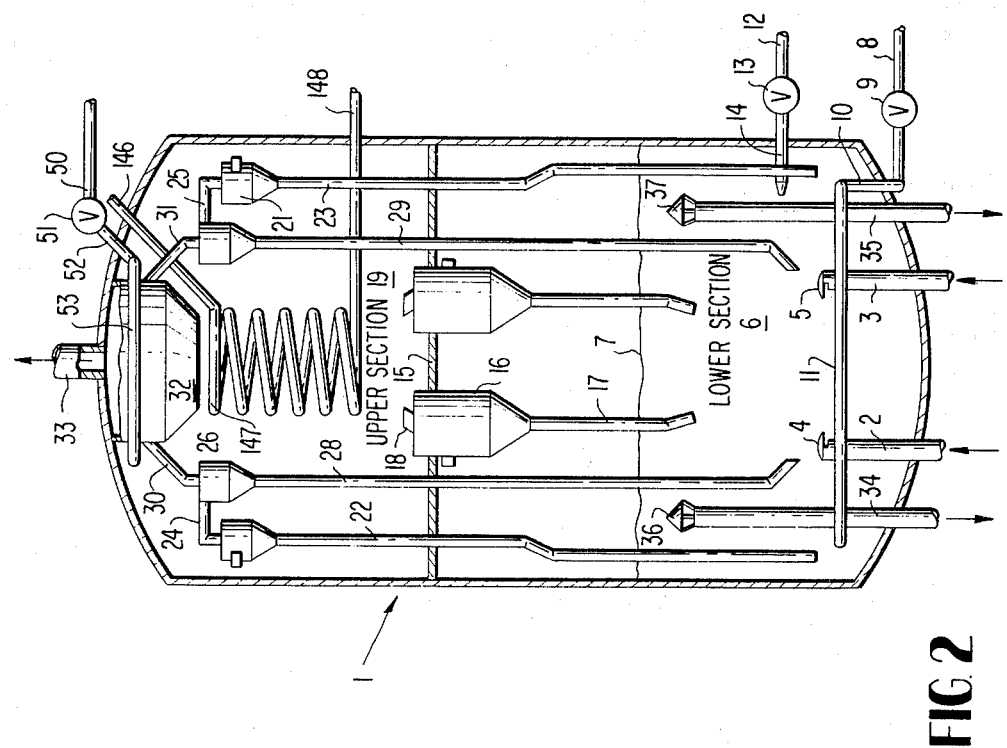

United States Patent [19]

McKinney

[11] 3,990,992
[45] Nov. 9, 1976

[54] REGENERATION OF CRACKING CATALYST IN A VESSEL WITH A PARTITION FORMING AN UPPER AND LOWER ZONE

[75] Inventor: Claude O. McKinney, Munster, Ind.

[73] Assignee: Standard Oil Company, Chicago, Ill.

[22] Filed: Apr. 12, 1974

[21] Appl. No.: 460,518

[52] U.S. Cl. .............................. 252/417; 23/288 B; 23/288 S; 208/120; 208/164
[51] Int. Cl.² .................. B01J 21/20; C10G 11/04; C10G 11/18
[58] Field of Search..................... 252/417; 208/104; 23/288 B, 288 S

[56] References Cited
UNITED STATES PATENTS

| | | | |
|---|---|---|---|
| 2,382,382 | 8/1945 | Carlsmith et al. ................... | 252/417 |
| 2,419,245 | 4/1947 | Arveson............................... | 252/417 |
| 3,083,082 | 3/1963 | Kleiber............................... | 23/288 S |
| 3,821,103 | 6/1974 | Owen et al........................... | 252/417 |
| 3,838,036 | 9/1974 | Stine et al............................ | 208/164 |
| 3,843,330 | 10/1974 | Commer et al. ................... | 23/288 B |
| 3,844,973 | 10/1974 | Stine et al............................ | 252/417 |
| 3,856,659 | 12/1974 | Owen.................................. | 252/417 |

FOREIGN PATENTS OR APPLICATIONS 2,256,276 6/1973 Germany ............................ 252/417

Primary Examiner—Winston A. Douglas
Assistant Examiner—P. E. Konopka
Attorney, Agent, or Firm—Morton, Bernard, Brown, Roberts & Sutherland

[57] ABSTRACT

In a fluidized cracking unit, the cracking catalyst regeneration vessel is specially adapted for high temperature operation to permit essentially complete combustion of coke on the spent catalyst particles and, in addition, the essentially complete combustion of carbon monoxide produced thereby, within the dense phase zone of the regenerator. A partition in the regenerator divides the lower dense phase zone operating at high temperatures from the upper dilute phase zone which may be cooled, for instance, by boiler tubes, water sprays and the like. The partition contains one or more rough separation catalyst knock-out means such as cyclone separators whereby hot catalyst particles are separated from the rising combusted gases and returned to the dense phase regeneration zone. In one embodiment, the regeneration vessel is elongated to facilitate recovery of most of the extra heat produced by complete carbon monoxide combustion by the catalyst particles returning to the dense phase zone. This invention is directed to both the high temperature dense phase zone catalyst regeneration process and to the apparatus employed in the process.

18 Claims, 4 Drawing Figures

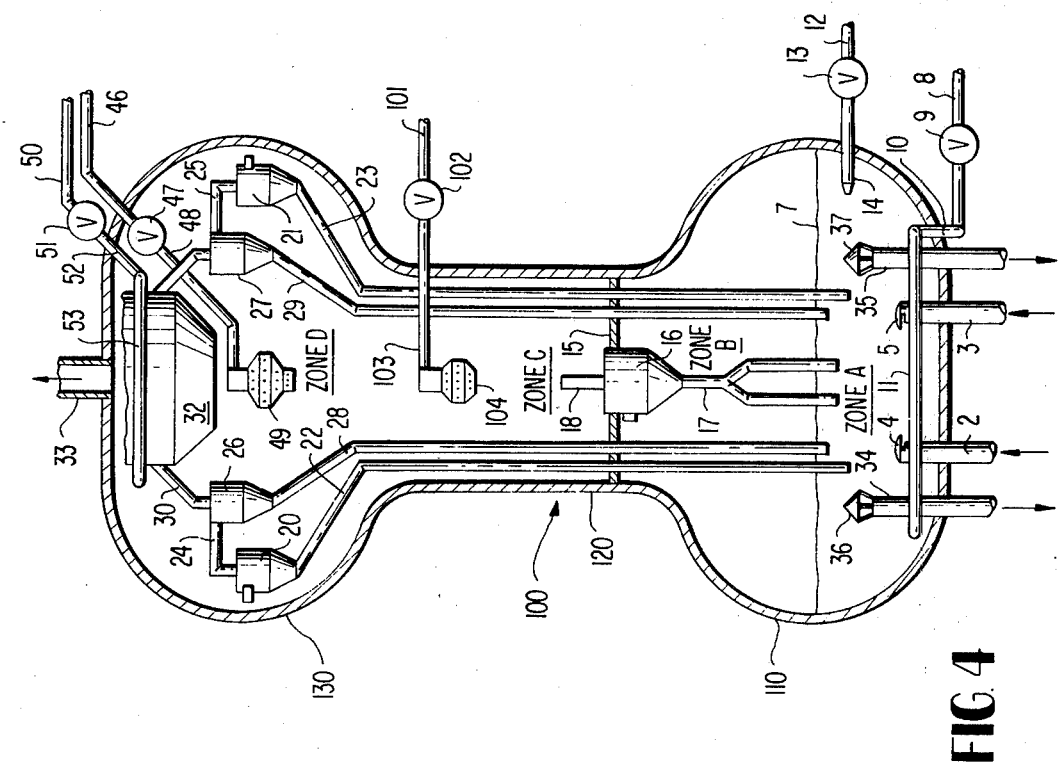

REGENERATION OF CRACKING CATALYST IN A VESSEL WITH A PARTITION FORMING AN UPPER AND LOWER ZONE

Catalytic cracking of heavy mineral oil fractions is one of the major refining operations employed in the conversion of crude oils to desirable fuel products, such as high-octane gasoline fuels used in spark-ignited, internal combustion engines. Illustrative of "fluid" catalytic conversion processes is the fluid catalytic cracking process, wherein high molecular weight hydrocarbon liquids or vapors are contacted with hot, finely-divided, solid catalyst particles, either in a fluidized bed reactor or in an elongated riser reactor, and the catalyst-hydrocarbon mixture is maintained at an elevated temperature in a fluidized or dispersed state for a period of time sufficient to effect the desired degree of cracking to lower molecular weight hydrocarbons, typically present in motor gasolines and distillate fuels. Suitable hydrocarbon feeds boil generally in the range from about 400° to about 1200° F., and are usually cracked at temperatures ranging from about 850° to 1050° F.

In the catalytic process, some non-volatile carbonaceous material, or "coke", is deposited on the catalyst particles. Coke comprises highly condensed aromatic hydrocarbons which generally contain a minor amount of hydrogen, e.g., about 4–10 wt. % hydrogen. As coke builds up on the catalyst, the activity of the catalyst for cracking and the selectivity of the catalyst for producing gasoline blending stocks diminish. The catalyst particles may recover a major proportion of their original capabilities by removal of most of the coke therefrom in a suitable regeneration process.

Catalyst regeneration is accomplished by burning the coke deposits from the catalyst surface with an oxygen-containing gas, such as air. Many regeneration techniques are practiced commercially, whereby a significant restoration of catalyst activity is achieved in response to the degree of coke removal. As coke is progressively removed from the catalyst, removal of the remaining coke becomes most difficult, and, in practice, an intermediate level of restored catalyst activity is accepted as an economic compromise.

The burning of coke deposits from the catalyst requires a large volume of oxygen or air. Oxidation of coke may be characterized in a simplified manner as the oxidation of carbon and represented by the following chemical equations:

a. $C + O_2 \rightarrow CO_2$ b. $2C + O_2 \rightarrow 2CO$ c. $2CO + O_2 \rightarrow 2CO_2$.

Reactions (a) and (b) both occur under typical catalyst regeneration conditions, wherein the catalyst temperature may range from about 1050° to about 1300° F., and are exemplary of gas-solid chemical interactions when regenerating catalyst at temperatures within this range. The effect of any increase in temperature is reflected in an increased rate of combustion of carbon and a more complete removal of carbon or coke from the catalyst particles. As the increased rate of combustion is accompanied by an increased evolution of heat, whenever sufficient oxygen is present, the gas-phase reaction (c) may occur. This latter reaction is initiated and propagated by free radicals.

A major problem often encountered and sought to be avoided in catalyst regeneration, particularly in fluid catalyst regeneration, is the phenomenon known as "afterburning", described, for example, in Hengstebeck, *Petroleum Processing*, McGraw-Hill Book Co., 1959, at pages 160 and 175, and discussed in *Oil and Gas Journal*, Volume 53 (No. 3), 1955, at pages 93–94. This term is descriptive of the further combustion of CO to $CO_2$, as represented by reaction (c) above, which is highly exothermic. Afterburning has been vigorouslly avoided in catalyst regeneration processes because it could lead to very high temperatures, which may damage equipment and cause permanent deactivation of the catalyst particles. Many fluid catalyst regenerator operations experience afterburning, and a very substantial body of art has developed around numerous means for controlling regeneration techniques so as to avoid afterburning. More recently, as operators have sought to raise regenerator temperatures for various reasons, elaborate arrangements have also been developed for control of regenerator temperatures at the point of incipient afterburning by suitable means for control of the oxygen supply to the regenerator vessel as set forth, for example, in U.S. Pat. Nos. 3,161,583 and 3,206,393, as well as in U.S. Pat. No. 3,513,087. In typical contemporary practice, accordingly, with avoidance of afterburning, the flue gas from catalyst regenerators usually contains very little oxygen and a substantial quantity of CO and $CO_2$ in nearly equimolar amounts.

Further combustion of CO to $CO_2$ is an attractive source of heat energy because reaction (c) is highly exothermic. Afterburning can proceed at temperatures above about 1100° F., and liberates approximately 4350 BTU/lb. CO oxidized. This typically represents about one-fourth of the total heat evolution realizable by complete combustion of coke. The combustion of CO has been performed controllably in a separate CO boiler, after separation of effluent gas from catalyst, as described in, for example, U.S. Pat. No. 2,753,925, with the released heat energy being employed in the generation of high pressure steam. Other uses of such heat energy have been described in U.S. Pat. Nos. 3,012,962 and 3,137,133 (turbine drive) and U.S. Pat. No. 3,363,993 (preheating of petroleum feedstock). Such heat recovery processes serve to minimize the discharge of CO into the atmosphere as a component of effluent gases and to avoid a potentially serious pollution hazard.

This invention relates to an improved fluidized catalytic cracking process in which spent catalyst regeneration, carbon monoxide-containing combustion products are further combusted to carbon dioxide within the catalyst regeneration vessel and in which the heat energy produced is predominantly recovered by the regeneration vessel catalyst particles. The fluidized cracking unit catalyst regeneration vessel contains a dense phase zone which is specially adapted for high temperature operation in which essentially complete combustion of coke and essentially complete combustion of resulting carbon monoxide to carbon dioxide are achieved. Advantageously, the process of this invention may be performed with conventional hydrocarbon catalytic cracking systems in which the existing catalyst regeneration vessel is modified or is replaced with a novel vessel and operation as more fully described below.

This invention is particularly useful in the fluid catalytic conversion of petroleum or other mineral oil feedstocks and is advantageously employed where at least a substantial portion of the conversion is effected in a dilute phase transfer line or riser reactor system. This invention makes possible an enhanced degree of energy production and conservation within a cyclic process for the catalytic conversion of hydrocarbon feedstocks, which includes provision for separation of catalyst from conversion products, regeneration of the separated catalyst and recycle of the regenerated catalyst to the reactor for the conversion of additional feedstock, wherein an increased proportion of heat energy is utilized within the cyclic system by improved continuous transfer from the exothermic to the endothermic processing zones. A particularly suitable petroleum conversion process for the practice of this invention comprises the fluid catalytic cracking process for the conversion of petroleum gas oils and heavier petroleum stocks to hydrocarbon components suitable for blending into fuels for automotive engines, jet power plants, domestic and industrial furnaces, and the like.

The process of this invention contemplates establishing a high operating temperature lower catalyst zone in a regeneration vessel by dividing the regeneration vessel by means of a partition. The partition in the vessel creates a lower zone containing a dense phase catalyst bed, preferably having a more dilute phase above the dense phase bed, and also creates an upper zone. The lower zone is sometimes referred to herein as the lower dense phase zone, and the upper zone as the upper dilute phase zone. This partition is located within the vessel to assure substantially complete combustion of the coke and the carbon monoxide in a lower zone containing the catalyst particles, and to assure that a major amount of heat produced thereby is recovered by the dense phase catalyst particles. The partition is generally located above the dense phase zone of the regenerator vessel at a height of about 50% to 80% of the total internal height of the vessel. The partition contains catalyst knock-out means so that fewer catalyst particles are transported to the upper zone by the combusted gases leaving the lower zone and passing into the upper zone. The operating conditions such as catalyst flow rate, oxygen-containing gas input rate and recycle rate, external cyclone cooling, and the like, are maintained such that essentially complete combustion occurs within the lower dense phase zone, preferably within the catalyst bed in this zone, and preferably at a temperature within the range of about 1150° F. up to about 1450° F. The upper zone can be cooled so that generally a temperature in the range of 1150° F. to about 1275° F. is maintained. This upper zone is generally at least about 1175° F., and preferably at least about 100° F. cooler than the lower zone.

The process of this invention further contemplates the recovery of some of the heat of combustion created within the lower zone by the cooling means employed in the upper zone. The cooling means may be boiler tubes located within the upper zone, or other cooling means such as water spray, etc. When cooling, for example, with steam, the heat transferred in the cooling process may be recovered outside the vessel by cooling coils and the like which are located outside the vessel. Thus, the process of this invention both essentially eliminates noxious carbon monoxide from the regeneration flue gas by complete combustion, and produces useful heat energy without employing special flue gas boilers or other complicated apparatus generally employed in controlled afterburning operations outside the regenerator. The regeneration vessel employed in the process of this invention has a partition between the lower dense phase zone and the upper dilute phase zone which includes catalyst-gas separation means and may contain conventional means to drop back any catalyst that might build up on the upper surface of the partition over a period of time. Generally, regeneration vessels are constructed of high temperature resistant materials and frequently such vessels will be constructed of materials having the ability to withstand higher operating temperatures as employed in this invention. However, often the apparatus employed in combination with the regeneration vessel, such as cyclones, dip-legs and the like, are constructed to withstand normal operating conditions, but not those used herein. It is, therefore, desirable for the process of this invention to consider the operable temperature range for each piece of apparatus to determine which must be made of special high temperature materials. Since temperatures in this process range from about 1150° to about 1450° F. or more in the dense phase zone, it is clear that all apparatus employed in or contiguous to the dense phase zone may have an operating temperature of, for example, at least about 1500° F. The dense phase zone of the regeneration vessel must be capable of operation at such temperatures and may be formed from high temperature materials such as metal alloys and other refractory materals. High temperature materials necessary for constructing the apparatus of this invention are commercially available and are well known in the art.

In a regeneration vessel for the process of this invention, it is necessary to construct a partition between the lower dense phase and upper dilute phase zones. The partition is constructed of high temperature materials well known in the art and contains catalyst knock-out means, e.g., rough cut cyclones, which separate the catalyst and combustion gases by returning most of the catalyst particles to the lower zone while issuing the combusted gases to the upper zone.

The partition generally should be constructed so as to isolate the lower zone from the upper zone, and may include the catalyst knock-out means. The partition is preferably in an essentially horizontal plane and is located between the upper and lower zones, but spaced considerably above the actual dense bed. For example, where the lower one-third of a vessel contains the dense bed during operation, the partition could be appropriately located so as to divide the vessel in half or even to divide it into a lower zone occupying slightly more than half of the vessel with the upper zone occupying slightly less than half of the vessel. These proportions are not limiting, but merely illustrate the desirability of dividing the vessel so as to have a lower zone larger than the dense bed. The arrangement, which is illustrated in the drawings discussed below, includes sufficient volume to permit essentially complete combustion within the lower zone without creating an excessively hot "hot spot" which might otherwise create temperatures which may be damaging to the catalyst particles. The arrangement also enables a major amount of the catalyst entrained in the gases to separate before the rising gases reach the partition, and this reduces the number and/or size of catalyst knock-out means required and reduces the wear and damage to those used. It is preferred that the partition be located sufficiently high above the lower dense phase to assure that most of the catalyst particles have disengaged from the rising gases before the gases enter the catalyst knock-out means, e.g., at the partition, and to assure that the gases entering the knock-out means have a density of less than about 1 or 2 pounds of catalyst per cubic foot of the catalyst-containing gases. Generally, the partition may be located at a height which is at least about 25%, but not more than about 80% or more, and preferably at least about 50%, but not more than about 75%, of the total internal height of the vessel.

Since the process of this invention may involve temperatures of up to, for example, about 1500° F., a desirable alternative to employing high temperature material devices within the vessel, particularly within or near the lower dense phase zone, involves locating the devices outside the regeneration vessel. For example, catalyst separation facilities which are normally operated within the vessel may be located outside of and away from it to permit continued use of existing, or use of less costly, heat sensitive or damageable equipment. This arrangement also permits the use of low cost, easily controlled cooling means, and facilitates some minor repairs without shutdown. Likewise, catalyst recovery equipment, such as primary recovery cyclones, may be located outside the vessel where they may be readily cooled or maintained at a desired temperature to prevent overheating. The catalyst particles and gas feed to these cyclones may also be precooled by water spray, boiler, and the like, to prevent overheating. The heat recovered by the cooling means employed may be recouped at another location within the overall cracking process where it is needed or useful. Catalyst particles recovered from these recovery means may be returned to the regeneration vessel and/or directly to the hydrocarbon feed stream to the reactor by any known means such as cyclone-dropout by gravity, pump, lift and the like.

Although a design which would embody any variation in the vessel described above may be used in the process of this invention, other novel designs may be employed. In one preferred embodiment of this invention, an apparatus is designed to facilitate essentially complete combustion in the lower zone at even more moderate temperatures than achieved with the modified vessels described above. The vessel contains a longer lower zone which is formed by the elongation of the vessel, allowing catalyst particles to fairly well settle in the lower zone. This lower zone, which is separated from the upper zone by a partition with knock-out means, actually consists of two zones — a dense bed, and a rather large catalyst disengaging zone. The disengaging zone may be two or more times the size of the bed to create a relatively low gas velocity and a large combustion area, both of which may contribute to lower combustion temperatures. The zone above the partition need not be as voluminous as the lower zone and may be designed so as to create a relatively high gas velocity, for example, by employing a narrower upper zone. This high velocity gas flow assists in assuring that catalyst particles do not build up on top of the partition, i.e., they do not "fall out" of the rising gases above the partition. Thus, the combusted gases may be passed through the upper zone at a higher velocity than the lower zone, and, in an aspect of this invention, the upper zone higher velocity is at least twice the lower zone velocity. This upper zone may preferably contain cyclones for fine cut removal of catalyst particles from the gases before they exit the vessel, and it preferably includes cooling means.

In another embodiment, the above design includes two zones above the partition as well as the two below it. The zone immediately above the partition is narrow for high gas velocity and includes heat removal or cooling means, and the uppermost zone is wider to include space for cyclones placed near the gas discharge line, and for additional cooling or heat recovery means.

In the process of this invention, substantially complete combustion of coke on the catalyst and substantially complete combustion of the resulting carbon monoxide occurs within the dense phase zone, and preferably essentially all or at least a major portion of the combustion occurs within the dense phase bed in that zone. The essentially complete combustion of coke and CO in the dense phase zone, particularly in the dense phase bed, enables the major amount of heat to be transferred to the catalyst particles. This produces recoverable heat energy in the catalyst particles and particles recovering the heat act as a "heat sink" to prevent carbon monoxide combustion "run away" temperatures. The combustion temperatures within the lower dense phase zone are maintained below, for example, about 1450° F. by proper catalyst particle circulation rates. Generally, the circulation rate from the reactor to this regenerator dense phase zone is about 2 to 10 pounds per pound of oil charged to the cracking reactor, preferably about 5 pounds per pound of oil charged usually provides proper temperature performance, and good control of reaction rates.

Many catalytic cracking processes are operated on the "heat balance" principle, depending upon combustion of coke for the evolution of heat required in the process. The heat balance type of operation on riser reactors which affords high conversion coupled with high selectivity often favors low coke laydown on catalyst and low temperature levels in the regenerator. Accordingly, an external heat source such as a feed pre-heat furnace, must often be added or, alternatively, an external source of fuel oil may be used to provide for an injection of liquid supplementary fuel firing in the regenerator. Such undesirable features are avoided by the process of this invention which permits efficient recovery of additional heat for transfer by regenerated catalyst particles to the riser reactor. The heat of combustion of coke in conventional operations is about 12,000 BTU/lb. The process of this invention may increase the available heat to about 17,000 or more BTU/lb. This higher heat of combustion raises the regenerator temperature, lowers the level of coke on regenerated catalyst and lowers the catalyst circulation rate while providing improved yields at a given conversion level.

The attached drawings, FIGS. 1 through 4, are illustrative, without limitation, of embodiments of this invention. Regeneration of spent catalyst from a suitable hydrocarbon conversion process can be effected in an improved manner by the novel process of this invention. Indeed, this improved process may be employed beneficially in many existing petroleum conversion process units, particularly fluid catalytic cracking units without limitation as to the spatial arrangement of cracking, stripping and regeneration sections thereof.

Figure 1:
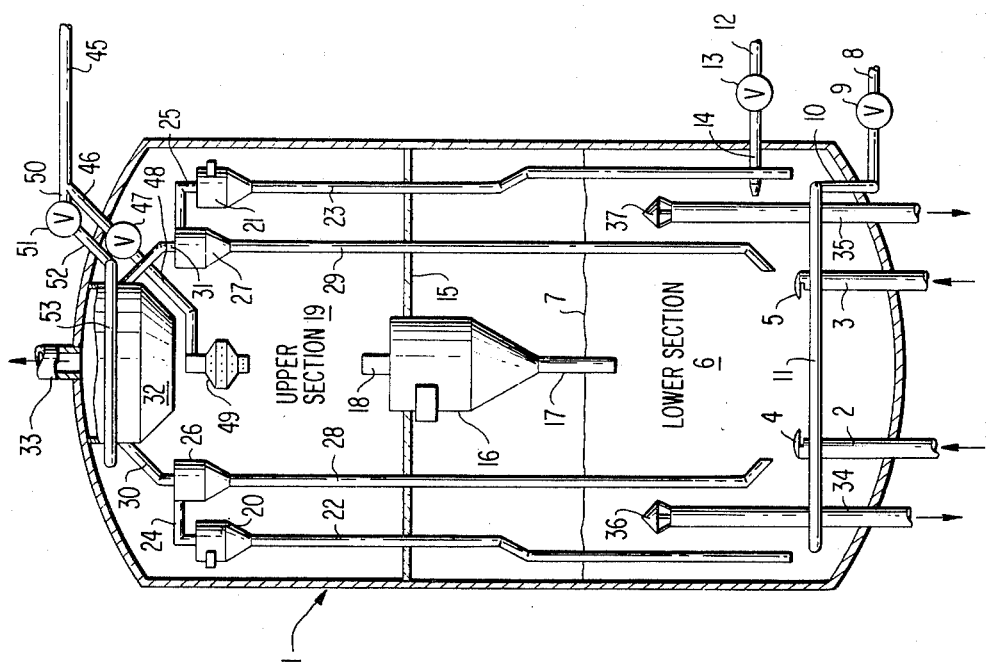

FIG. 1 is illustrative of one embodiment of this invention employing bottom entry of stripped, spent catalyst to a novel regenerator. Spent catalyst particles from a stripping zone enter the bottom of regeneration vessel 1, flowing upwardly through inlet lines 2 and 3 and discharging into the dense catalyst bed through discharge heads 4 and 5. The vessel is divided into lower section 6 and upper section 19 by partition 15 having catalyst knock-out cyclone 16. The dense-phase catalyst bed is maintained within the bottom section 6 of the regenerator vessel and extends upwardly to the catalyst phase interface 7. Catalyst within the dense-phase bed is fluidized by the flow of combustion air through line 8, valve 9 and line 10 to air ring 11. Substantially balanced air flow patterns through the regeneration zones may be achieved by the use of additional air rings, not shown, as required. Combustion of coke contained on the spent catalyst with air is initiated within the lines 2 and 3 and the dense-phase bed. Higher temperatures may be achieved by temporarily burning a stream of torch oil, for example, a decanted oil, within the bed. Torch oil may be added by passage through line 12, valve 13 and line 14 which terminates in a nozzle located above the air ring 11. Fluidizing air velocities continuously maintain the dense bed of lower section 6 in a fluidized state while supplying oxygen for the coke combustion and for the complete combustion of carbon monoxide to carbon dioxide within the dense bed wherein substantial heat of combustion is received by the catalyst particles. The combusted gases carry some fluidized particles into rough cut cyclone 16 where most of the particles are separated and discharged through dip-leg 17 and the gases and remaining particles pass into the upper section 19 via cyclone line 18.

Most of the catalyst particles remaining in the gases in line 18 are separated in the upper section first-stage cyclones and discharged downwardly through dip-legs 22 and 23 into the dense-phase zone. Gases and the few remaining catalyst particles are passed through interstage cyclone lines 24 and 25 to upper section second-stage cyclone separators 26 and 27 where substantially all of the remaining catalyst is separated and passed downwardly through dip-legs 28 and 29 into the dense-phase bed. Substantially spent combustion gas then passes through lines 30 and 31 into plenum 32 and finally is discharged from the regenerator vessel through line 33. This may be followed by suitable heat exchange, not shown, with refinery stream or for production of process steam. Regenerated catalyst from the dense bed is withdrawn through standpipes 34 and 35, fitted with collector heads 36 and 37, for return to the catalytic conversion process.

Excessive temperature levels in the top section of the regenerator may be controlled by distribution of steam, for example through line 46, valve 47 and line 48 to steam pod 49. Temperatures in the vincinity of the plenum may also be controlled with steam fed through line 50, valve 51 and line 52 to steam ring 53 which surrounds plenum 32. Additional cooling, if desired, may be provided by use of a water spray, not shown, which may advantageously be directed within the region of interstage cyclone lines 24 and 25. In the alternative, other cooling means may be employed as mentioned above. For example, extended surface cooling coils may be employed in place of steam spray. In addition, such devices, as well as promoters and the like mentioned above, may be employed in the lower dense phase section. The air supply to the dense phase section normally provides an excess of oxygen over the amount required to effect complete combustion of the coke on the catalyst particles to steam and carbon monoxide, and either with the air or alone or in combination with auxiliary devices mentioned above, combustion is essentially completed within the zone below partition 15.

In FIGS. 1, 2 and 3, like components are numbered identically, and the discussions regarding those components are not repeated below.

FIG. 2 is illustrative of an embodiment similar to that of FIG. 1. In FIG. 2, however, two rough cut cyclones are employed in partition 15. The number of catalyst knock-back means employed is a choice of design and is a function of cyclone size, gas-particle flow rate, and height above the dense bed. The cyclones shown in FIG. 2 may be modified with cooling coils to assure desired temperatures are not exceeded. In addition, catalyst recycle cooling means may be employed which withdraw particles from the dense bed, cool them, and return them to the dense bed. As shown in FIG. 2, the steam spray means shown in FIG. 1 has been replaced by cooling coils with coolant inlet 146, coils 147, and outlet 148. This modification results in a greater heat recovery because the heat is transferred to e.g., steam, directly within the vessel rather than downline from the vessel when steam spray cooling means is used where temperatures are lower than in the regenerator vessel.

FIG. 3 illustrates another embodiment similar to that in FIG. 1 except that the knock-out cyclone 16 is located in the upper section 19 above partition 15 and the catalyst particles and gases flow through outlet pipe lines 60 and 61 to the cyclone 16 via line 62 for the rough-cut cyclone separation. Most of the particles are separated and discharged through dip-leg 17 and the gases remaining particles pass through line 18 and are cooled as they pass through line 18 by steam entering line 146, controlled by valve 147, and passing via line 148 to a spray nozzle, not shown, within line 18. The gases exiting line 18 are generally picked up by flared line 63 connecting to the first stage upper section cyclone 20 from which the particles and gases follow the paths as outlined for FIG. 1. This arrangement is particularly advantageous because it allows more rough cut cyclone height and dip-leg length within a given vessel height.

FIG. 4 illustrates another novel catalyst regenerator used in the process of this invention. The vessel shown generally as 100 contains a wide lower portion 110, a narrow middle portion 120 and a wide upper portion 130. The vessel is divided into two spaces by partition 15 containing rough cut cyclone 16. The vessel contains four zones labelled A, B, C and D, With A and B comprising the lower section 110, C comprising the middle section 120, and D comprising the upper section 130. Lower section 110 contains catalyst input and output means, air line, torch, and dense bed, identically shown in FIGS. 1 and 2. Upper section 130 contains cyclones, spray, plenum and gas exit as shown in the upper section of the vessel in FIG. 1.

The vessel of FIG. 4 is essentially that of Fig. 1, but considerably elongated and includes a narrowed midsection. Also, the area above the dense bed zone A, shown as zone B, is substantially larger than that of the vessels shown in FIGS. 1, 2 and 3. This larger combustion zone results in a relatively lower gas velocity and greater volume for combustion of a given quantity of carbon monoxide. This arrangement is advantageously used with high temperature and high oxygen input wherein a low dense bed volume and a high dilute phase volume may be employed. With high temperature and oxygen input the coke may be burned off quickly to permit a low dense bed volume. Catalyst particles passed through a low volume dense bed are exposed to less deteriorating contact than particles passed through a dense bed volume and this may increase the life and efficiency of the catalyst particles. Further, a low volume dense phase bed system has a greater vapor volume which results in lower density load on the knock-out means, e.g., cyclone, and this may decrease maintenance costs.

Zone C, located above the partition 15, is narrower than the lower zone B to create a relatively high gas velocity. The higher velocity aids in preventing the settlement of any catalyst particles out of the gas and onto the top of partition 15. As shown, zone C includes a cooling means in addition to that conventionally located near the top of the vessel. Steam is fed through line 101 controllably by valve 102 through line 103 to spray pod 104 where the steam cools the combusted gases rapidly rising to zone D.

As shown, zone D is wider than zone C to allow for the return cyclones 20, 21, 26 and 27. Alternatively, zone D may be the same width or diameter as zone C with closer cyclones, fewer cyclones, or with cyclones placed outside the vessel. Zone D contains spray means as shown, but both or either of the spray devices in zones C and D may be replaced by other cooling means, as for example, the coils 147 shown in FIG. 2.

Suitable hydrocarbon feedstocks for cracking include light gas oils, heavy gas oils, wide-cut gas oils, vacuum gas oils, kerosenes, decanted oils, residual fractions, reduced crude oils and cycle oils derived from any of these, as well as suitable fractions derived from shale oil, tar sands processing, synthetic oils, coal hydrogenation and the like. Such fractions may be employed singly or in any desired combination.

Suitable catalysts include those containing silica and/or alumina. Other refractory metal oxides such as magnesia or zirconia may be employed, limited only by their ability to be effectively regenerated under the selected conditions. With particular regard to catalytic cracking, preferred catalysts include combinations of silica and alumina, containing 10–50 wt. % alumina, and particularly their admixtures with "molecular sieves" or crystalline aluminosilicates. Admixtures of clay-extended aluminas may also be employed. Such catalysts may be prepared by any suitable method such as impregnation, milling, cogelling, and the like, subject only to provision of the finished catalyst in a physical form capable of fluidization.

Suitable molecular sieves include both naturally-occurring and synthetic aluminosilicate materials, such as faujasite, X-type and Y-type aluminosilicate materials, and ultrastable, large-pore crystalline aluminosilicate materials. The alkali metal ions contained therein are exchanged in large part for ammonium or hydrogen ions or polyvalent metal, e.g. rare earth, ions, by known techniques. When admixed with, for example, silica-alumina to provide a petroleum cracking catalyst, the molecular sieve content of the fresh finished catalyst particles is suitably within the range from about 5 to 20 wt. %, or about 1 to about 15 wt. %, desirably about 8–15 wt. %. An equilibrium molecular sieve cracking catalyst may contain as little as about 1 wt. % crystalline material.

The stripping vessel is suitably maintained essentially at conversion reactor temperature in the range from 850° to 1050° F., and desirably will be maintained above about 925° F. Preferred stripping gas is steam, although nitrogen, other inert gas or flue gas may be employed, introduced at a rate and at a pressure, usually in the range from 10 to 35 p.s.i.g., suitable to effect substantially complete removal of volatile components from the spent conversion catalyst. Stripped spent catalyst particles enter the dense-bed section of the regenerator vessel through suitable lines and valving from the stripping vessel. Entry may be from the bottom or from the side.

The dense-phase fluid-bed regeneration stage is usually maintained at a pressure in the range from 5 to 50 p.s.i.g. and a temperature in the range from about 1150° to about 1450° F., desirably about 1250° to about 1400° F. The regeneration gas may be air, oxygen, oxygen-enriched air or other oxygen-containing gas mixture suitable for combustion of coke deposited on silica, alumina and/or aluminosilicate surfaces. The regeneration gas enters the bottom dense-bed stage from a blower or compressor. A fluidizing velocity suitably in the range from about 1 to 3 feet/second, desirably about 1.7 to about 2.6 feet/second, may be maintained in the dense bed zone.

The regeneration gas fluidizing the dense-bed is suitably charged to the regenerator in an amount somewhat in excess to that required for complete combustion of coke (carbon and hydrogen) to carbon dioxide and steam. The excess of oxygen may vary from about 5% to about 30% of the theoretical oxygen requirement, but advantageously need not be greater than about 10%. For example, when air is employed as the regeneration gas, a 10% excess of air provides only about 2 vol. % oxygen in the effluent spent gas stream.

The temperature level of the dense bed may be initially attained by the burning of torch oil within the dense bed, with appropriate increase in the amount of oxygen introduced into the regenerator, and thereafter carbon monoxide combustion can be sustained without torch oil burning. Flame or spark ignition provides another suitable means for initiating the combustion. the requisite temperature may be lowered by inclusion of a combustion catalyst or promoter within the regeneration zone. For example, a suitable metallic bar or mesh network or screen may be inserted in the combustion zone. Alternatively, fluidizable metal compounds, particularly powdered oxides of transition group metals, e.g., ferric oxide ($Fe_2O_3$), manganese dioxide ($MnO_2$), rare earth oxides, and the like may be added to the catalyst charge or confined on trays situated in the regenerator vessel. For example, iron oxide powder fluidizable with the conversion catalyst may be added to the catalyst in an amount up to at least about 0.5 wt. %, desirably about 0.2 wt. %. Fluidizable catalytic and non-catalytic powders may also be impregnated with suitable metallic combustion catalysts and maintained within the regenerated zones or cycled through the conversion system, as set forth more particularly in commonly assigned co-pending United States patent application Ser. No. 447,753, filed Mar. 4, 1974. Use of such reagents may lower the temperature required to initiate and sustain combustion by as much as about 100° F., or more.

In addition to the promoting materials, other devices may optionally be utilized within the lower zone. For example, boiler tubes or coils may be placed within the zone at its hottest location to maintain the zone at a temperature below an operable maximum safe temperature. Additionally, recycle catalyst coolers may further remove heat from the bed, adjust the lower zone temperature, and produce low cost heat energy.

Although further combustion of carbon monoxide occurs quite rapidly at the maintained dense-bed temperature, much of this combustion may actually occur in the upper portion of the zone below the partition as the gas stream sweeps upwardly. Less catalyst is present in this area and with less heat-absorbing medium the temperature is higher. However, as indicated, in areas where temperatures exceed those desired, appropriate means may be employed to control the temperature.

Although the partition may be located above and spaced away from the dense bed itself, considerable quantities of catalyst particles flow with the rising gases and pass into the rough cut separators contained in the partition. Most of the catalyst can be removed from the rising gases in the partition separators, but some catalyst is carried into the upper zone with the rising gases. These remaining catalyst particles which rise with the gases to the top portion of the upper zone can be effectively and essentially completely removed from the combusted gases be separation means, usually comprising cyclone separators which optionally may be arranged in a plurality of stages, from which catalyst is returned directly through dip-legs to the dense-bed zone and spent regeneration and combustion gases are collected in a plenum and finally discharged for suitable recovery of the heat energy contained therein. Recovery processes for heat from flue gas include steam generation, spent catalyst stripping, indirect heat exchange with various refinery streams, and particularly with feed to the particular conversion process, and employment in various drying or evaporation arrangements.

The catalyst particles which pass through the upper region are subjected to cooling or heat transfer means which lowers the particle temperature by as much as, for example, 200° F. or more. These cooler catalyst particles upon return to the dense bed serve to assure maintenance of temperature control within the bed. Since the temperature of the lower zone of the vessel may be as high as 1450° or 1500° F., regenerated catalyst particles are removed from the regenerator at a temperature within the range of 1150° to 1500° F., and suitably contain from about 0.01 to about 0.10 wt. %, desirably no more than about 0.05 wt. %, e.g., 0.01 to 0.05 wt. % and preferably no more than about 0.03 wt. %, e.g., about 0.01 to about 0.03 wt. % carbon, or coke. The catalyst is returned to the conversion reactor for mixing therein with fresh petroleum feedstock, optionally together with recycle or other hydrocarbon stock, thereby eliminating the need for additional preheating of the feedstock. Alternatively, the regenerated hot catalyst may pass through other heat exchange systems before being returned to the reactor.

A further benefit from this novel regeneration process relates to the unusually low carbon monoxide content in the effluent gas stream from the regenerator. Whereas flue gas from conventional regeneration of cracking catalysts usually contain about 6 to 10% carbon monoxide, a similar amount of carbon dioxide and very little oxygen, the flue gas from regeneration, in accordance with this invention, generally contains less than 1.0 vol. %, e.g., less than 0.2%, e.g., about 0.05 to about 0.2 vol. %, and often no more than about 5–500 ppm. e.g. 0 to about 500 ppm. carbon monoxide. The oxygen content of the flue gas may vary from about 0.1% to about 10%, advantageously being within the range from 1 to 3% and desirably no more than about 2%. From an ecological point of view, the extremely low level of carbon monoxide in the flue gas stream is highly desirable and meets existing standards for ambient air quality. Indeed, whenever required the remaining carbon monoxide, if there is any, may suitably be burned in the exhaust from the regenerator flue gas stack. From a process point of view, heat recovery by downstream combustion of carbon monoxide in a CO boiler or afterburner arrangement is avoided, with consequent substantial savings in process equipment and operational costs.

Optimum use of this invention is an integral part of a fluid cracking unit employing a fluidizable cracking catalyst, such as a silica-alumina catalyst having a crystalline alumino-silicate or molecular sieve component, in a transport, or "riser", reactor with attendant provision for stripping of spent, coked catalyst followed by regeneration of the spent catalyst according to the process of this invention. Preferably, cracking occurs exclusively in the riser reactor and a following dense catalyst bed is not employed. In the typical case where riser cracking is employed for conversion of a gas oil, the throughput ratio (TPR), or volume ratio of total feed to fresh feed, may vary from 1.0 to 2.0. The conversion level may vary from about 40 to 100% and advantageously is maintained above about 60%, for example, between about 60% and about 90%. By conversion is meant the percentage reduction of hydrocarbons boiling above 430° F. at atmospheric pressure by formation of lighter materials or coke. The weight ratio of catalyst to oil in the riser reactor may vary within the range from about 2 to 10 and the fluidized dispersion will normally have a density within the range from about 1 to 5 pounds/cubic foot. Desirably, the catalyst-oil ratio is maintained at no greater than about 5 and preferably within the range from about 3 to about 5. The fluidizing velocity may range from about 15 to about 60 feet/second. The riser reactor should preferably be substantially vertical, having a ratio of length to average diameter at least about 25. For production of a typical naphtha product, the bottom section mixing temperature within the riser reactor is advantageously maintained at a temperature about 1000° F or higher so that the top section exit temperature will be about 950° F. or higher. Under these conditions, including provision for a rapid separation of spent catalyst from effluent oil vapor, a very short period of contact between catalyst and oil will be established. Contact time within the riser reactor will generally be within the range from about 2 to about 10 seconds and preferably within the range from about 3 to about 7 seconds. Shorter contact times are preferred because most of the hydrocarbon cracking occurs during the initial increment of contact time and undesirable secondary reactions are avoided. This is especially important if higher product yield and selectivity, including lesser coke production, is to be realized.

Short contact time between catalyst particles and oil vapors may be achieved by various means. Oil feed may be injected at multiple points along the length of the lower section of the riser reactor and different injection points may be employed for fresh and recycle feed streams. The lower section of the riser reactor may, for this purpose, include up to about 80% of the total riser length in order to provide extremely short effective contact times conducive to optimum conversion of petroleum feeds. Where a following dense catalyst bed is employed, provision may also be made for injection of catalyst particles and/or oil feed directly into the dense bed zone.

Although the conversion conditions set forth above are directed to the production of gasoline as fuel for spark-ignition internal combustion engines, the processing scheme may be suitably varied to permit maximum production of heavier hydrocarbon products such as jet fuel, Diesel fuel and heating oils.

The following examples are illustrative of the process of this invention.

EXAMPLE I

Mid-continent gas oil (23.4°API) having a boiling range from 650° to 1050° F. is cracked in a fluidized transport-type reactor at an average cracking temperature of 960° F. The throughput ratio (weight total feed/weight fresh feed) is 1.34 and the total feed rate is 36,000 bbl/day. The catalyst particles comprise silica-alumina together with 10 wt. % hydrogen and rare earth-exchanged, Y-type crystalline aluminosilicate or molecular sieve material and are circulated at a rate of 19.6 tons/minute. The weight ratio of catalyst to oil in the cracking zone is 3.7.

Effluent from the riser reactor is passed to a separation zone and is fed into a cyclone separator. Hydrocarbon products are removed and spent catalyst is passed downwardly through the cyclone dip-leg into a stripping zone maintained at 950° F. The settled catalyst is stripped with steam to remove remaining volatile material prior to regeneration.

Stripped spent catalyst, containing 0.9 wt. % coke on catalyst, is fed into the bottom section of a regenerator vessel of the type shown in FIG. 1 where it is fluidized with air in a dense-phase catalyst bed maintained at about 1275° F. by combustion of coke and carbon monoxide, and occasional combustion of torch oil as required. The air rate is set to provide approximately 14 lbs. air per lb. coke on the spent catalyst. Combustion of carbon monoxide within the lower dense-phase zone and particularly immediately above the dense bed interface produces a temperature thereof about 1350° to 1400° F. Some catalyst entrained in the rising gas stream is removed by cyclone separators in the partition, and some remained in the rising gases and are carried into the upper zone in the upper portion of the regenerator vessel. Gases and entrained catalyst are passed from the upper zone into a series of cyclone separators with catalyst being returned directly to the dense-phase zone. The temperature at the upper zone cyclone inlet is held at approximately 1250° F. with water spray as required, the water spray being directed below the inlet of the cyclone system. The gas stream leaving the cyclone system is passed first to a plenum area located at the top of the regenerator vessel and then is discharged at 1250° F. Catalyst is withdrawn from the dense-phase bed as required through a standpipe at 1275° F. for return to the transport reactor.

Analysis of the regenerated catalyst indicates the residual coke content to be only 0.03 wt. %. The catalyst particles are white to light gray in color. Analysis of the effluent gas indicates the carbon monoxide content to be 0.0 vol. % and the oxygen content to be 1.9 vol. %. The cracking conversion is 67.7 vol. % on feed. From heat balance calculations, coke is burned at the rate of 20,700 lbs./hr., liberating 17,800 BTU/lb. coke.

Most of this heat is absorbed by the catalyst particles and more is recovered from the combusted effluent gases and thus kept within the cyclic fluid cracking system.

EXAMPLE II

The same cracking process including the same feed, throughput ratio, other operating conditions, catalyst, catalyst regenerator input flow rates and air content as in Example I is operated in conjunction with the regeneration vessel shown in FIG. 4.

The stripped spent catalyst, containing about 0.9 wt. % coke, is fed into the bottom of the vessel where it is fluidized with air in a dense-phase catalyst bed, shown as zone A, maintained at a temperature of 1275° F. by combustion of coke and of the resulting carbon monoxide, with start-up assistance from combustion of torch oil. The air rate is, as in Example I, set to provide approximately 14 lbs. air per lb. coke on the spent catalyst. Essentially complete combustion of the carbon monoxide occurs just above the dense bed, shown as zone B, and achieves a temperature of about 1450° F. The rising gases with some catalyst pass through the partition cyclones with much of the catalyst being returned to the dense bed. The remaining catalyst and rising gases are passed through the constricted area of the vessel, shown as zone C, to the top portion of the upper section, shown as zone D. The gases passing through zone C are cooled by steam spray as its velocity increased to about two to four times that of the gases in zones B and D. The gases are further cooled in zone D, pass through separator cyclones, through the plenum and exit the vessel as the remaining catalyst particles are separated in the cyclone separators while at a temperature of about 1250° F., and return to the dense bed. The exiting gases are discharged at a temperature of about 1250° F. and subjected to effluent line heat recovery means. Catalyst is withdrawn from the dense phase bed as required through standpipes at about 1275° F. for return to the transport reactor.

Analysis of the regenerated catalyst shows results similar to those of Example I. In this example, slightly high temperatures are used to achieve complete, CO combustion with the particular vessel design. These temperatures are confined, enabling the cyclones to be constructed with less expensive heat resistant materials. Alternatively, lower temperatures may be employed with this design with extra coupling to achieve a greater reduction in heat resistant materials and/or full combustion with less throughput.

As shown by both examples, the process and apparatus of this invention permit essentially or fully complete combustion of carbon monoxide within the dense-phase zone of the regenerator with substantial heat recovery without damage to the catalyst particles.

It is claimed:

1. A process for the regeneration of a fluidizable cracking catalyst which has been deactivated with coke deposits while employed in a catalytic hydrocarbon cracking process, comprising the steps of passing coked catalyst particles to a lower portion of a regeneration vessel, said regeneration vessel having a partition dividing said vessel into a lower zone and an upper zone and said partition being at a position which is about 25 to 80 percent of the internal height of the vessel;

contacting the coked catalyst particles in the lower zone of the regeneration vessel with an oxygen-containing regeneration gas stream at fluidizing velocities, said gas stream providing at least sufficient oxygen for burning coke from the catalyst particles and for essentially complete combustion of the resulting carbon monoxide formed during the burning of the coke;

burning the coke from the catalyst particles within the lower zone which contains a dense catalyst phase, and essentially completely combusting resulting carbon monoxide while the carbon monoxide and oxygen-containing regeneration gas are within the lower zone, wherein said partition, in conjunction with the burning, facilitates the maintenance of temperatures sufficient for essentially complete combustion of carbon monoxide within the lower zone while in contact with said catalyst particles in an amount sufficient to absorb a major amount of heat resulting from the carbon monoxide combustion and avoid temperatures which may be damaging to catalyst particles;

passing the resulting combustion gases and entrained catalyst particles through catalyst separation means whereby most of the catalyst particles are returned to the lower zone and the combustion gases with remaining entrained catalyst particles are sent to the upper zone wherein said combustion gases, with the remaining entrained catalyst particles, reach a temperature which is lower than in said separation means;

passing the combustion gases with remaining entrained catalyst particles through catalyst separation means in the upper zone, whereby particles separated from the combustion gases are returned to the lower zone, and the combustion gases having a low carbon monoxide content are exhausted; and withdrawing regenerated catalyst particles having a low content of residual coke, from the lower zone of the regeneration vessel.

2. The process of claim 1 wherein said combusted gases with any entrained particles are cooled in said upper zone.

3. The process of claim 1 wherein the regeneration temperature within the lower zone is maintained in the range from about 1150° to about 1450° F.

4. The process of claim 3 wherein the temperature within the lower zone is maintained in the range from about 1250° to 1400° F.

5. The process of claim 1 wherein the temperature in the upper zone is maintained in the range from about 1150° to about 1275° F.

6. The process of claim 5 wherein said temperature in the upper zone is controlled by cooling.

7. The process of claim 1 wherein the catalyst comprises silica and alumina together with a crystalline aluminosilicate.

8. The process of claim 7 wherein the catalyst comprises between about 1 and about 15 wt. % crystalline aluminosilicate.

9. The process of claim 1 wherein the regenerated catalyst particles contain no more than about 0.05 wt. % coke.

10. The process of claim 9 wherein the regenerated catalyst particles contain no more than about 0.03 wt. % coke.

11. The process of claim 1 wherein the flue gas stream contains no more than about 0.2 vol. % carbon monoxide.

12. The process of claim 11 wherein the carbon monoxide content of the flue gas stream is in the range from about 0 ppm. to about 500 ppm.

13. The process of claim 1 wherein the regeneration gas stream comprises air flowing upwardly from the lower zone to fluidize the catalyst particles, the temperature within the lower zone is maintained within the range from about 1250° to about 1400° F., the temperature within the upper zone is maintained within the range from about 1150° to about 1275° F., the regenerated catalyst particles contain less than 0.10 wt. % coke, flue gas stream withdrawn from the regeneration vessel contains less than 1.0 vol. % carbon monoxide, and the temperature in the upper zone is at least about 100° F. less than that in the lower zone.

14. The process of claim 13 wherein the regenerated catalyst particles contain from about 0.01 to about 0.05 wt. % coke.

15. The process of claim 14 wherein the carbon monoxide content of the flue gas stream is within the range from about 0.05 to about 0.20 vol. %.

16. The process of claim 14 wherein the carbon monoxide content of the flue gas stream is in the range of 0 ppm. to about 500 ppm.

17. The process of claim 1 wherein the combusted gases with any remaining entrained catalyst particles are passed through the upper zone at a higher velocity than through the lower zone.

18. The process of claim 17 wherein the upper zone higher velocity is at least twice the lower zone velocity.

* * * * *